UNITED STATES PATENT OFFICE.

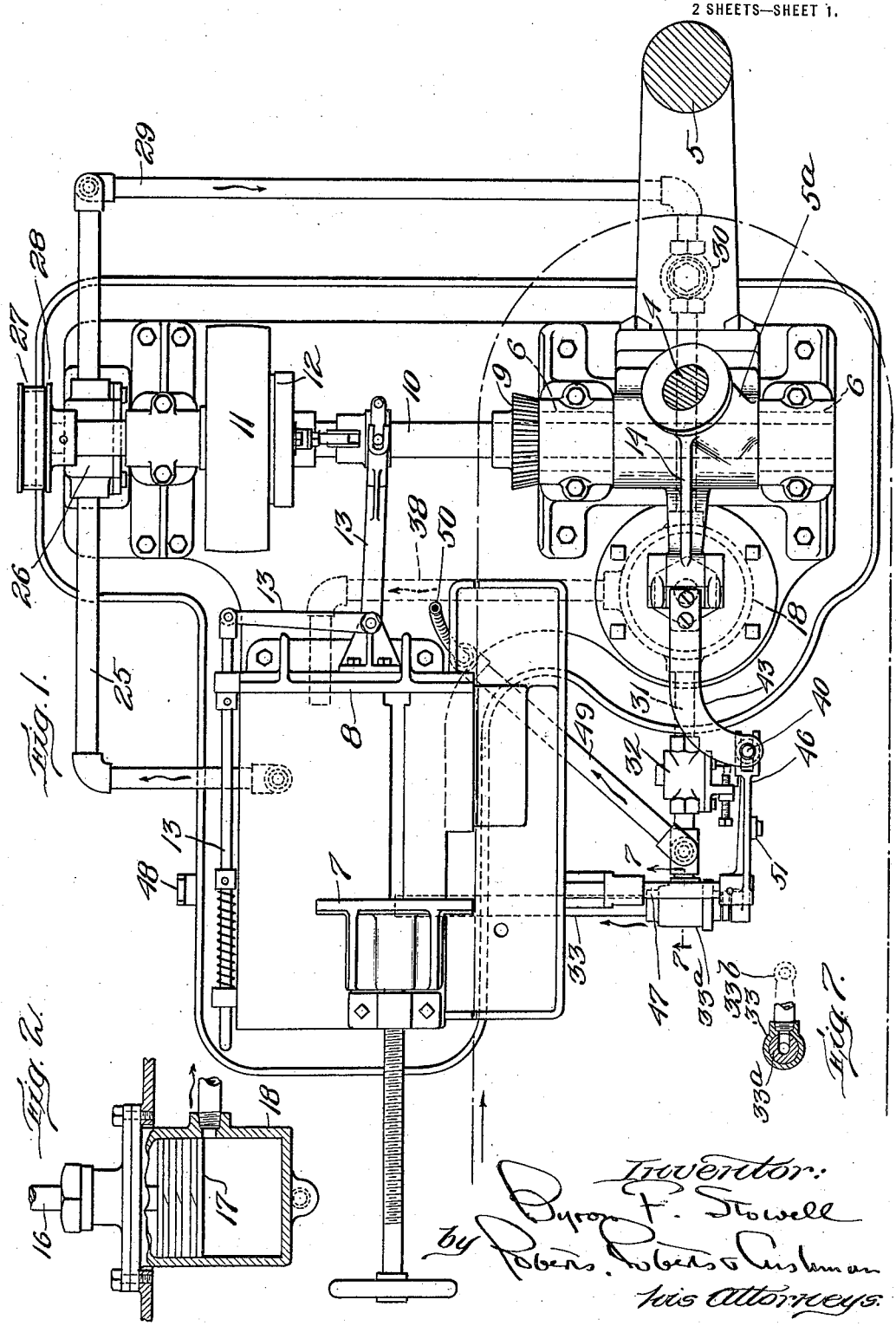

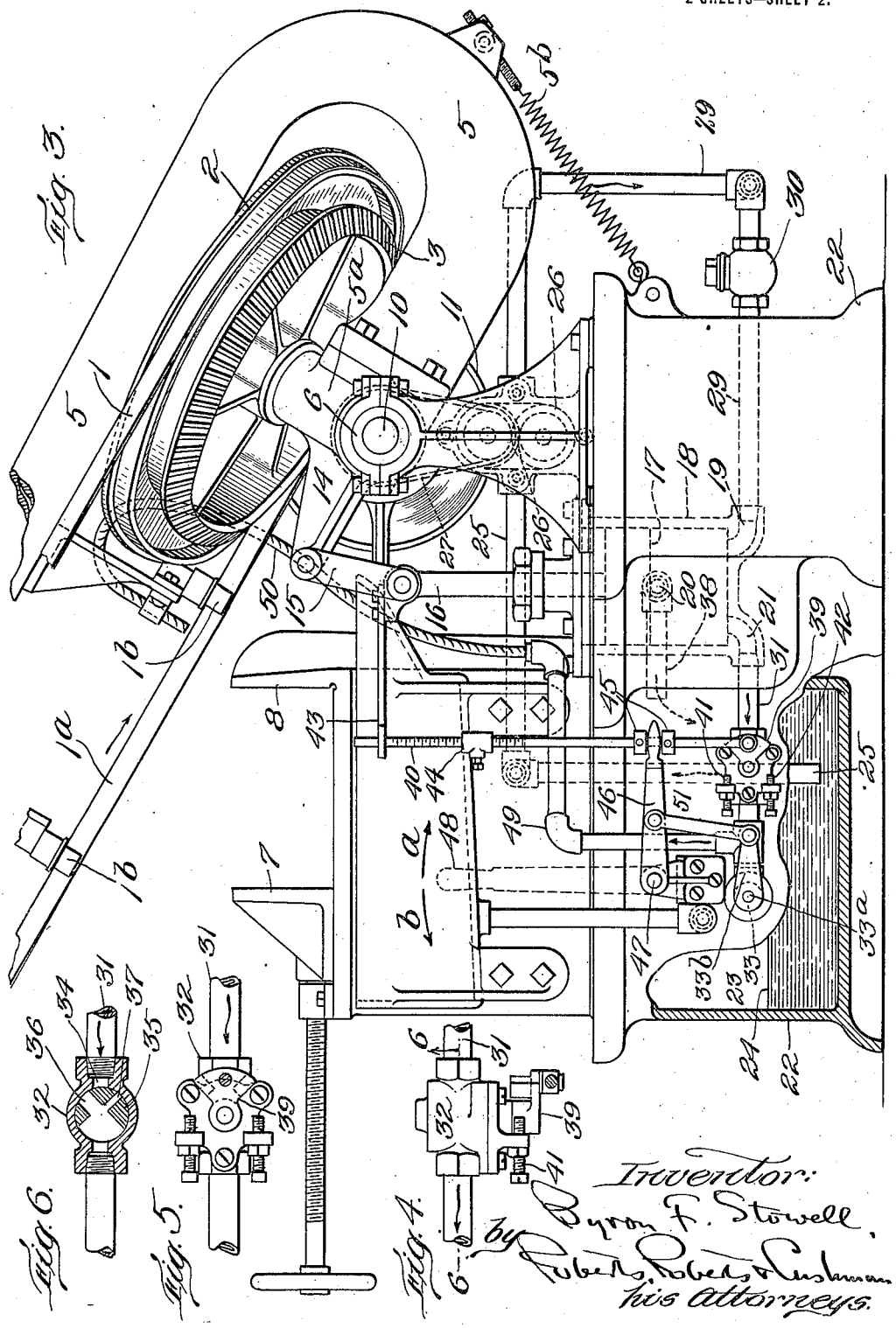

BYRON F. STOWELL, OF SPRINGFIELD, MASSACHUSETTS, ASSIGNOR, BY MESNE ASSIGNMENTS, TO METAL SAW & MACHINE CO., INC., OF SPRINGFIELD, MASSACHUSETTS, A CORPORATION OF MASSACHUSETTS.

OPERATING DEVICE FOR MATERIAL-WORKING MACHINES.

1,390,469.    Specification of Letters Patent.    Patented Sept. 13, 1921.

Application filed September 22, 1919. Serial No. 325,433.

*To all whom it may concern:*

Be it known that I, BYRON F. STOWELL, a citizen of the United States of America, and resident of Springfield, in the county of Hampden and State of Massachusetts, have invented new and useful Improvements in Operating Devices for Material-Working Machines, of which the following is a specification.

This invention concerns machinery for working metal, wood or other material and especially relates to means for effecting the approach, separation, engagement of, or relative motions between the material worked upon and an implement for working upon the material, as well as to improved means for securing lubrication of the implement and the field of action of the implement upon the material when desired, as when the material is metallic.

The invention is useful in connection with and may be embodied in any machinery in which there is relative motion of approach or motion during contact between the material worked upon and any implement, tool, drill, grinder, saw, or other cutter intended to act upon the material in a regulated manner. To illustrate by one particular embodiment only the genus comprising the invention, this specification will describe the invention as utilized in a band-sawing machine for cutting metal. In such machines as heretofore known the essential elements comprise an endless band-saw, means for supporting and driving the saw, a work-vise or holder, and means permitting the saw and the material to be cut to be approached, and for thereafter permitting a regulated feeding motion of the saw into the work. Usually feeding is effected by moving the saw laterally of its running cutting edge in relation to relatively fixed material to be cut, but the work is sometimes moved to and upon the saw. In either case, effective control of the motion of approach of the saw and work, and of the feeding motion after contact of the saw, should be provided for, and so far as I am aware, heretofore has not been satisfactorily accomplished in practice.

It will be understood that in any machine of the kind improved, the proper rate of progress of the saw or other cutter into the work depends variably upon the hardness of the material being worked, the speed and gage of the cutters and other factors, such as heating of the cutters. Many milling cutters, saws, drills, and other such tools are broken by an improvident speed of approach of the cutter to the work, or by a too rigid and vigorous feeding motion induced by rigid mechanical connections, and the nature of the screw-motions or gearing heretofore principally relied upon for such motions inherently prevents a fine or delicate regulation of feed, dependence being upon the device of a series of rates of feed variable by sharply marked steps only. Such mechanical connections invariably depend upon the ratio of motion of cutter to the feed, whereas it may be highly desirable to vary the absolute motion of either the cutter or the feed, or both, independently of the other motion. It is frequently the case that the work is done at a less efficient rate than that at which the cutter will perform its function, because the next higher step of the ratio of feed to driving motion is dangerously high.

When the cutting implement is a band-saw, special difficulties are encountered. Either the work must be moved to the tool, thus introducing the problem of either moving parts often attached immovably, or of moving large or variable weights; or of moving one end of a large and awkward piece of material such as a shaft, rail or girder; or else the driving means, band-wheels and stretcher mechanism must be moved to the work, involving a feed-motion capable of dealing with these heavy parts while in motion. For such purposes, mechanical feeding connections are inefficient resulting in such difficulties in use and so many breakages of saws as to render machines designed on principles as heretofore used highly expensive, troublesome, and impractical for many classes of work in which the rapid and continuous action of an endless cutter would be most advantageous if proper regulation of the approach and feeding movements could be attained.

Principal objects of this invention are to provide motor means for controlling the approach, separation, engagement or relative motion between an implement and material to be worked upon by the implement which shall lessen breakages and permit efficient function of the implement; to provide means under the control of the operator for automatically approaching the implement and the work at a relatively high speed, and thereafter automatically to cause relative motion between the implement and the work during cutting at a predetermined and readily adjustable slow rate suitable to the variable character of the work; to provide means acting with a predetermined force only, independently of the true rate of drive of the implement for causing relative motion between the implement and the work; and to provide improved means for lubricating the work and implement automatically made active during cutting only. Further objects in general are to provide operating means for machines for performing cutting operations which shall be capable of efficient and safe use by relatively unskilled attendants.

In the accompanying drawings,—

Figure 1 is a plan view of an improved band-sawing machine including the invention;

Fig. 2 is a detail axial section of a cylinder forming a part of the control mechanism;

Fig. 3 is a side elevation of the machine;

Fig. 4 is a plan;

Fig. 5 is an elevation;

Fig. 6 is a vertical section on line 6—6 of Fig. 4, of a valve forming part of the mechanism; and Fig. 7 is a detail section on line 7—7 of Fig. 1.

The saw blade 1 may be an endless band, having a part $1^a$ guided in vertical position by guide rolls $1^b$ carried by a pair of brackets 2, one of which is shown in Fig. 3. The pulley 2 of Fig. 3 is compounded with a bevel gear 3 journaled on an inclined stud 4 projecting from the hub $5^a$ of a stretcher-frame including an arm 5, the weights being so distributed as to cause gravity to tend to turn the frame counter-clockwise about the center of the hub as viewed in Fig. 3. The force tending to turn the frame may be regulated by any form of counterbalance such as the adjustable spring connection $5^b$. The hub $5^a$ is made with trunnions 6 journaled in bearings on the frame of the machine so that the arm 5 is supported to swing in a vertical plane to move the saw 1 toward and from the work held by the jaws 7 and 8 of any suitable form of work-vise mounted on a base 22 for the working parts. The bevel gear 3 is driven by a bevel pinion 9 fast on the main shaft 10, the latter being provided with a pulley 11 driven by a belt, not shown. The pulley 11 is also one member of a clutch, the other member 12 of which is operated through the shipper devices 13 to connect and disconnect the pulley 11 and the shaft 10.

The hub $5^a$ is rigid with another short arm 14 operated by a motor, preferably a hydraulic motor, and preferably capable of effective reversal, under control of the operator and of certain automatic connections presently explained. Arm 14 may be connected, for instance, by links 15 with the rod 16 of a piston 17 movable up and down within a cylinder 18 fixed to the frame of the machine. This cylinder 18 has an inlet 19 and two outlets 20 and 21.

The base 22 of the machine frame includes a reservoir 23 for holding a supply 24 of liquid, preferably a lubricant such as an oil, emulsion or a soapy solution. The machine preferably includes a source of power for operation of the motor 17, 18, and other uses; for instance, the reservoir 23 is connected by a pipe 25 with the inlet of a gear or other pump 26 driven through a chain 27 or other driving means by a pulley 28 fast on main shaft 10. The outlet of pump 26 is connected by a conduit 29 with the cylinder inlet 19 and in this conduit 29 is arranged a check-valve 30 which opens toward cylinder 18. The outlet 21 of cylinder 18 is connected by a pipe 31 with the inlet main control valve 32 whose outlet is connected by a conduit 33 with reservoir 23.

Conduit 33 is controlled by a valve $33^a$ having an operating arm $33^b$, operated by means presently mentioned, so as to open the conduit 33 whenever the arm $33^b$ is lifted above the position shown in Fig. 3, and to close or restrict the conduit 33 whenever the arm $33^b$ is lowered.

Valve 32 is of any suitable type adapted when in one position to close the outlet 31, in another position to open the outlet 31 by a wide passage, and in another position to open the outlet 31 through a restricted and preferably adjustable bleeder passage for the slow outlet of fluid through outlet 31.

The preferred construction shown provides a valve 32 of the type having a rotatable plug 35, Figs. 3, 5 and 6, in which a wide port 36 and a narrow port 37, separated by an imperforate part of the plug 35 may be brought into registry with the passage 34 connecting with outlet conduit 31, ports 36 and 37 both communicating with the pipe 31 and its branch 49, presently mentioned. Preferably the parts are so proportioned that a quarter-turn of plug 35 will successively overlap passage 34 with port 36, with an imperforate part of the plug 35 (position of Fig. 6) and with port 37.

Plug 35 is rigid with an operating arm 39 having faces adapted to take against limit screws 41, 42, in integral lugs of the valve casing. These screws can be adjusted to limit the motion of the ports 36 and 37 in respect to the passage 34, so as to determine the capacity of the educt through pipe 31 when the plug 35 is in either extreme of its rotative positions. It should be noticed that either port in valve 32 is of relatively large capacity, the motion of the piston 17 in either direction depending upon the difference between the rate of the pump and the outflow at valve 32. This arrangement permits a delicate adjustment of the effective rate of increase or decrease of the fluid in cylinder 18 without dependence on an easily-clogged narrow bleeder passage.

Arm 39 may be operated by a vertically disposed rod 40 pivoted at its lower end to arm 39 and guided at its upper end in a hole in a bracket 43 projecting from the piston rod 16. A collar 44 adjustably secured on arm 40 is positioned to be operated by the lower side of bracket 43 when the piston 17 is in a predetermined low position. Rod 40 is also arranged to be normally operated to an extent and in either direction permitted by the other parts by any convenient means, preferably by a rock-shaft 47 having a lever handle 48 near the operator's stand and having a rigid arm 46 taking between collars 45 fast on rod 40.

The operating arm 33$^b$ for valve 33$^a$ is preferably controlled by the shaft 47 and limited by the position of the rod 40 by suitable connections, shown as a link 51 connecting arms 46 and 33$^b$.

A branch pipe 49 takes out of the pipe 31 between valve 32 and valve 33$^a$, delivering into a flexible terminal 50 having one end fastened to the frame arm 5 so as to deliver the lubricant, whenever the valve 33$^a$ is sufficiently closed to provide back-pressure, from the cylinder 18 above the stretch 1$^a$ of the saw 1 and above the work in the vise 7, 8, whence the liquid flows by any suitable gravity channels into the tank 23.

When the machine is in use the clutch 12 is set, the blade band 1 is in motion and the pump 26 is pumping liquid from reservoir 23 into motor cylinder 18. With the valve 32 in its intermediate position as shown in the drawings, the return conduit 33 is cut off from the cylinder so that the liquid cannot leave the latter via pipe 31 and return pipe 23. Consequently the piston 17 is raised and held at the top of cylinder 18 thus holding the saw band and arm 5 in their uppermost positions away from the work in vise 7, 8. As the piston reaches this uppermost position within the cylinder it uncovers the outlet 20 so that the continuous operation of pump 26 merely circulates the lubricant from reservoir 23 through conduit 25, pump 26, conduit 29, cylinder 18 and thence back to reservoir 23 by way of pipe 38 which connects outlet 20 with reservoir 23.

With the parts in the condition illustrated in the drawings the pulley 11 is running loose on the shaft 10 and all other parts of the machine are at rest, piston 17 being held at the upper end of its cylinder by the liquid trapped therein. When the machine is to be used the operator sets clutch member 12 by means of shipper devices 13, which puts shaft 10 in motion and starts pump 26. Then he pushes handle 48 to the limit of its movement in the direction of arrow $a$, Fig. 3, where he holds it until the saw band has been brought down close to but not quite in contact with the work. This movement of the handle 48 acts through shaft 47, arm 46 and rod 40 to swing valve arm 39 against stop 42 where the relatively large plug-port 36 is in register with inlet 34, Fig. 6, which allows the liquid to escape from the motor cylinder 18 faster than it is pumped into the same at a predetermined rate depending upon the unbalanced weight of arm 5 and the resistance to flow in the conduit thereby effecting a controlled lowering of the arm 5 at relatively fast speed. The valve 33$^a$ is open, and there is no flow of liquid through pipe 49. When the saw band 1 has been thus brought close to the work, the handle 48 is swung to the extreme of its movement in the direction indicated by the arrow $b$, which swings valve arm 39 away from stop 42 and against stop 41, thereby registering plug port 37 with inlet 34 and closing valve 33$^a$ so that thereafter, that is, while the saw is cutting into the work, the descent of the arm 5 and saw band 1 is at a predetermined slower speed appropriate to cutting. The descent of the arm 5 is limited by the engagement of bracket 43 with collar 44, Fig. 3, said engagement serving to push the valve arm 39 from its uppermost position into its intermediate position where the inlet 34 is closed. When inlet 34 is thus automatically closed the liquid builds up in motor cylinder 18, thus automatically raising the piston 17 and arm 5 and cutting off flow through pipe 49, 50, by opening valve 33$^a$. As soon as the piston uncovers the outlet 20 further upward movement of the piston and arm is stopped and the parts remain in this condition until the handle 48 is again operated.

It will be observed that the automatic return to beginning position of the cutter 1 follows from the cutter having reached a predetermined depth of cut adjusted by the position of collar 44, and that the flow of cutting liquid is begun when the ports are positioned for feeding the cutter into the work, and ends when the cutter ceases its function. It will also be observed that the motion of the cutter while in the work is resisted by the hydraulic resistance at valve 32, but that the force pressing the cutter toward the work is only the unbalanced gravity of the cutter-carrier frame comprising arm 5 and its attachments. By this provision any resistance beyond normal to the advance of the cutter into the work will overcome the force tending to move the cutter farther in, and the device can be depended upon to feed no faster than at the predetermined rate as conditions of the work may demand.

I claim:

1. A material working machine having therein an implement for working on the material, means to support the implement, means for actuating said implement, means to support the material, a motor acting on one of said supports to cause relative motion between the implement and the material and means operative for energizing said motor independently of the actuation of the implement.

2. A material working machine having therein an implement for working on the material, means to support the implement, means to support the material, a hydraulic motor acting on one of said supports to cause relative motion between the implement and the material and means for supplying such motor with a substantially continuous supply of pressure fluid.

3. A material working machine having therein an implement for working on the material, means to support the implement, means to support the material, a reversible motor acting on one of said supports to cause relative motion between the implement and the material in both directions and means for supplying energy to said motor uninterrupted and in a substantially constant amount.

4. A material working machine having therein an implement for working on the material, means to support the implement, means to support the material, a reversible hydraulic motor acting on one of said supports to cause relative motion between the implement and the material in both directions and means for continuously supplying fluid to said motor under substantially constant pressure.

5. A material working machine having therein means to support the material and an implement for working on the material, means tending to cause relative approach between the implement and the material, a hydraulic motor for separating the implement and material, means for delivering pressure fluid to said motor in a continuous and uninterrupted stream, and means for controlling the motion of the motor to permit approach of the implement and material at a predetermined rate.

6. A material working machine having therein means to support the material, means to support an implement to work upon the material, means for imparting uni-directional movement to said implement, a hydraulic motor for moving said implement supporting means, and means for controlling the motor to cause relative motion between the material and the implement for working on the material at a predetermined rate independent of the rate of motion given the implement for its operating function.

7. A material working machine having therein a support for the material, an implement and means to drive the implement for operating on the material, a movable frame supporting the implement and a part of its driving means, means tending to cause the approach of the material and the implement, and hydraulic means automatically made active to separate the supports at the termination of a predetermined motion of approach.

8. A material working machine having therein material working means, drive mechanism therefor, and means to support the material, one of said means being movable in respect to the other, means tending to cause approach of material and implement, hydraulic means independent of said drive mechanism and normally tending to separate the material and the implement, and means for rendering the separating means ineffective to a predetermined extent, whereby to cause the material and implement to be approached at a predetermined rate.

9. A material working machine having therein means to support the material, an implement for working on the material, means for imparting a uni-directional movement to said implement, means tending to cause the implement to approach the material, hydraulic means governing the rate of approach, and means acting to separate the implement and material.

10. A material working machine having therein means to support the material, an implement for working on the material, means tending to cause the implement to approach the material, hydraulic means governing the rate of approach, and means acting automatically to separate the implement and material at the completion of a predetermined extent of approaching motion.

11. A material working machine having therein means to support the material, means to support and means to drive an implement for working on the material, and means for causing relative motion between the material and the implement for working on the material at a rate independent of the motion of the implement for its operating function, comprising means constantly tending to cause approach of the material and implement, hydraulic means normally active to move apart implement and material, and means for causing the hydraulic means to yield to permit approach at a predetermined rate, said hydraulic means being operative independently of the actuation of the means for driving said implement.

12. A material working machine having therein a support for the material, an implement and means for imparting uni-directional movement to said implement for operating on the material, a movable frame supporting the implement, means tending to cause the approach of the material and the implement, hydraulic means active to move apart the material and implement, and means permitting the material and implement to approach at a predetermined rate.

13. A material working machine having therein means to support the material, a cutter and driving means therefor for cutting into the material, means tending to cause the cutter to approach the material as the material is removed by the cutter, and a motor for limiting the maximum rate of approach, said means permitting the cutter to be held to a slower rate by the resistance of the material, and constantly and uniformly acting means for operating the motor in a manner tending to separate the cutter and material.

14. A material working machine having therein means to support the material, a cutter, means for imparting a uni-directional movement to the cutter for incising the material, means tending to cause the cutter to approach the material as the material is removed by the cutter, a hydraulic motor for limiting the maximum rate of approach during contact of cutter and material, said means permitting the cutter to be held to a slower rate by the resistance of the material, and means for operating the motor to separate the cutter and material.

15. A material working machine having therein a support for the material, a band cutter and means for imparting uni-directional movement to said cutter for operating on the material, a movable frame supporting the cutter and a part of its driving means, means tending to swing the frame to cause the approach of the material and the cutter, and reversible hydraulic means for limiting the rate of approach to a predetermined maxium and for swinging the frame away from the material support.

16. A material working machine having therein a support for the material, an implement, a movable support for the implement, means for actuating said implement for operating upon the material comprising an element journaled on said support, means tending to cause the approach of the material and the implement, a motor for moving apart the implement and the material, means for causing the motor to permit approach at a predetermined rate, and devices for changing the rate of motion permitted by the motor.

17. A material working machine having therein a support for the material, an implement and means to drive the implement for operating on the material, a movable frame supporting the implement and a part of the driving means, means tending to cause the approach of the material and the implement, a hydraulic motor for separating and for controlling the rate of approach of implement and material, and a device for predetermining at will different rates of approach.

18. A material working machine having therein a support for the material, an implement and means to drive the implement for operating on the material, movable means supporting the implement, a hydraulic motor and means for causing a constant and substantially uninterrupted inflow thereto of pressure fluid, for moving one of said supporting means, and a valve adapted to control outflow of fluid from the motor.

19. A material working machine having therein a support for the material, an implement and means to drive the implement for operating on the material, movable means supporting the implement, a hydraulic motor and means for causing a constant and substantially uninterrupted inflow thereto of pressure fluid, for moving one of said supporting means, a valve adapted to control outflow of fluid from the motor, and means for maintaining said motor inactive in one position of said valve 20. A material working machine having therein a support for the material to be worked upon, an implement for working upon the material and means to drive the implement, means supporting said implement for movement in respect to the material in one dimension, and means for causing motion of the implement in respect to the material in another dimension comprising a cylinder, a piston in the cylinder connected to the implement supporting means, means supplying a substantially constant stream of liquid tending to fill the cylinder and thereby to support the implement away from the work, and means for releasing the liquid from the cylinder at a predetermined rate.

21. A material working machine having therein a support for the material to be worked upon, an implement for working upon the material and means to drive the implement, means supporting said implement for movement in respect to the material in one dimension, and means for causing motion of the implement in respect to the material in another dimension comprising a cylinder, a piston in the cylinder connected to the implement supporting means, means constantly tending to fill the cylinder with liquid at a predetermined rate and thereby to lift the implement away from the work, and means for releasing the liquid from the cylinder at a predetermined rate in excess of the rate of filling during operation of said filling means.

22. A material working machine having therein a material support, a cutter, and movable supporting means for the cutter, in combination with a cylinder and piston for moving the supporting means, means for supplying a substantially constant stream of fluid under pressure to said cylinder to move the cutter away from the material, and means for permitting the fluid to escape from the cylinder at a predetermined rate, whereby to cause approach of the cutter and the material at a predetermined rate.

23. A material working machine having therein a material support, a cutter and movable supporting means for the cutter, in combination with a cylinder and piston for moving the supporting means, means for supplying a continuous stream of fluid under pressure to said cylinder irrespective of the position of said supporting means, thereby tending to move the cutter away from the material, and means for permitting the fluid to escape from the cylinder at a predetermined rate, including a valve and means adapted to close the valve at a predetermined position of the cutter, whereby to cause the fluid pressure device to move the cutter away from the material.

24. A material working machine having therein a cutter for cutting into the material, movable means to support and drive the cutter, means to support the material, fluid pressure operated means permitting relative feeding motion between the cutter and the material, and means for discharging fluid from said fluid operated means near the place of operation of the cutter upon the material, and automatically actuable valve means for controlling such discharge.

25. A material working machine having therein means to support the material, an endless cutter, a movable support therefor, and means for driving the cutter uni-directionally whereby to cut into the material, a hydraulic motor for moving one of said supporting means, means for operating the motor to permit approach between cutter and material as the material is removed by the cutter, and means for limiting the maximum rate of approach, said operating means permitting the cutter to be held to a slower rate than said maximum by the resistance of the material.

26. A material working machine having therein a cutter and driving means therefor, means to support the material, means to support the cutter, and means for moving one of said supporting means in opposite directions toward and away from the other of said means, said moving means permitting motion in one direction at any of a plurality of different rates, each independent of the rate of motion of the cutter for its operating function.

27. A material working machine having therein a support for the material, a band cutter and means for imparting uni-directional movement to the cutter for operating on the material, a movable frame supporting the cutter and a part of its driving means, means tending to swing the frame to cause the approach of the material and the cutter, and a hydraulic motor for swinging the frame adapted to limit the rate of approach to a predetermined maximum.

28. A material working machine having therein a support for the material, an implement and means to drive the implement for operating on the material, a movable frame supporting the implement and a part of its driving means, means tending to swing the frame to cause the approach of the material and the implement, a hydraulic motor adapted to swing the frame away from the material, and a device for predetermining at will different rates of a reverse motion of the motor.

29. A material working machine having therein a support for the material, an implement and means to drive the implement for operating on the material, a movable frame supporting the implement and a part of its driving means, means tending to swing the frame to cause the approach of the material and the implement, a hydraulic motor adapted to swing the frame away from the material, and an automatically actuable valve adapted to stop and to reverse the motion of the hydraulic motor.

30. A material working machine having therein a material support, a cutter, and movable supporting means for the cutter, in combination with a cylinder and piston for moving the supporting means, means for supplying a substantially constant stream of fluid under pressure to said cylinder irrespective of the position of said supporting means, thereby tending to move the cutter away from the material, and means for permitting the fluid to escape from the cylinder at a predetermined rate, whereby to cause approach of the cutter and the material at a predetermined rate.

31. A material working machine having therein a material support, a cutter, and movable supporting means for the cutter, in combination with a cylinder and piston for moving the supporting means, means for supplying fluid under pressure to said cylinder to move the cutter away from the material and means for permitting the fluid to escape from the cylinder at a predetermined rate including a valve, and means adapted to close the valve at a predetermined position of the cutter, whereby to cause the fluid pressure device to move the cutter away from the material.

32. In a material working machine having relatively movable parts, a motor for moving the parts of the machine in reference to each other comprising a piston and cylinder, means constantly active to force pressure fluid into the cylinder, an outlet passage from the cylinder irrespective of the relative positions of said movable parts, and means for increasing and decreasing the effective opening through said passage, whereby to determine by difference between the respective rates of inflow and outflow to and from the cylinder the respective directions and rates of motion of said piston.

33. In a material working machine having relatively movable parts, a motor for moving the parts of the machine in reference to each other comprising a piston and cylinder, constantly acting means to force pressure fluid into the cylinder, an outlet passage from the cylinder, means for increasing, stopping, and decreasing the effective opening through said passage, and an outflow passage arranged to be uncovered at a maximum position of the piston in one direction of its motion.

34. In a material working machine having relatively movable parts, the combination of a reservoir for liquid, a rotary pump constantly active during operation of the machine for delivering a steady and substantially constant stream of fluid, a hydraulic motor, and conduits from reservoir to pump and from pump to motor, with connections for moving parts of the machine controlled by the motor, an exhaust conduit leading from the motor to the reservoir, and means for predetermining the relative motions of the movable parts comprising means for variably throttling one of said conduits.

35. In a material working machine having relatively movable parts, the combination of a reservoir for liquid, a pump constantly active during operation of the machine, a hydraulic motor, and conduits from reservoir to pump and from pump to motor, with connections for moving parts of the machine controlled by the motor, an exhaust conduit leading from the motor to the reservoir, and means for predetermining the relative motions of the movable parts comprising an automatically controllable valve for throttling said exhaust conduit.

36. In a material working machine, the combination with an endless cutter for working on the material, a reservoir for lubricant liquid, and a hydraulic motor adapted to move working parts of the machine, of a conduit and means for supplying fluid from the reservoir to the motor under pressure, a conduit leading from the motor to the reservoir, and automatically controllable means for causing fluid flowing in the circuit including the motor to be diverted to and upon the cutter to lubricate the field of action of the cutter on the material.

37. In a material working machine having movable parts, the combination with a cutter for working on the material at certain positions of the parts, a reservoir for lubricant liquid, and a hydraulic motor adapted to move the working parts of the machine, of a conduit and means for supplying fluid from the reservoir to the motor under pressure, a conduit leading from the motor to the reservoir, and means for causing fluid flowing in the circuit including the motor to be diverted to and upon the cutter to lubricate the field of action of the cutter on the material when the cutter is operating on the material, and to suspend this flow when the cutter is in idle position.

38. In a material working machine having a cutter and moving parts operated by a hydraulic motor, the combination with a fluid-circuit comprising a lubricant liquid reservoir, conduits to and from the motor, and means for pumping the liquid through said circuit, of means for lubricating the cutter and controlling the motor comprising a valve for throttling an educt passage from the motor, a duct leading from the circulatory conduit to the cutter, a valve controlling flow in the duct, and means connecting the valves for coördinate operation.

39. A material working machine having a movable part adapted to position an implement, a hydraulic motor and connections therefrom for moving the part, a reservoir for fluid, a conduit circuit including the reservoir, the motor and a constantly operated rotary pump; a valve for controlling the operation of the motor by throttling the conduit circuit, and automatically actuable means for operating the valve.

40. A material working machine having a movable part adapted to position an implement, a hydraulic motor and connections therefrom for moving the part, a reservoir for fluid, a conduit circuit including the reservoir, the motor and a constantly operated rotary pump; a three-way valve for controlling the operation of the motor by throttling the conduit circuit, and means for automatically setting the valve in a predetermined position upon the attainment of one position of said movable part.

41. A material working machine having therein a movable part adapted to support an implement, a hydraulic motor comprising a cylinder, a movable piston therein connected to the movable part, and means for controlling the position and motion of the piston comprising a device for causing inflow into the cylinder at a constant rate of a liquid at a predetermined pressure, an educt conduit leading from the cylinder, and valve means for controlling the educt conduit having therein a plurality of passages adapted for alternative use, at least one of which is of capacity to permit at said pressure a greater flow than that caused by said device, and another of which is of less capacity than sufficient to permit flow at said constant rate and pressure.

42. A material working machine having therein a movable part adapted to support an implement, a hydraulic motor comprising a cylinder, a movable piston therein connected to the movable part, and means for controlling the position and motion of the piston comprising a device for causing inflow into the cylinder at a constant rate of a liquid at a predetermined pressure, an educt conduit leading from the cylinder, and valve means for controlling the educt conduit having therein a plurality of passages adapted for alternative use, at least one of which is of capacity to permit at said pressure a greater flow than that caused by said device, and another of which is of less capacity than sufficient to permit flow at said constant rate and pressure, in combination with means for manually controlling the valve means, and automatic means for closing the educt conduit when the movable part reaches one position.

43. A machine of the class described having a hollow base, a fluid tank within said base, a cylinder having a piston therein also disposed within said base, a pipe from the head end of said cylinder to said receptacle, a valve in said pipe, a movable element mounted upon said base, connections between said piston and said element whereby to control the rate of movement of the latter, and devices actuable by movement of said element for changing the position of said valve.

44. A material manipulating machine having a hollow base, a fluid tank therein, a vertically disposed cylinder having a piston therein arranged within the base, a pipe leading from the lower end of the cylinder to the tank, a multiple-way valve in said pipe, an implement carrying frame movably mounted on the base, connections between said frame and piston, and means for moving said valve from open to closed position, said means being automatically operable upon predetermined movement of said frame.

45. A material working machine having a material support, a material working implement, a support for said implement, said supports being relatively movable, and means for controlling the relative movements of said supports comprising a motor and means constantly operable independently of the relative position of said supports for supplying energy for said use by said motor.

46. A material working machine having a material support, a material working instrumentality, a support for said instrumentality movable whereby to permit movement of said implement toward and from the material support, fluid motor means for controlling the movement of said movable support, means for supplying pressure fluid to said motor at a substantially uniform rate regardless of the position of said movable support, and a regulable outlet passage for controlling the discharge of fluid from said motor.

Signed by me at Springfield, Massachusetts, this 16th day of September, 1919.

BYRON F. STOWELL.